Dec. 17, 1935.  J. SCHMIDT  2,024,391
WHOLE GRAIN CORN CUTTER
Filed July 29, 1931    4 Sheets-Sheet 4

Patented Dec. 17, 1935

2,024,391

UNITED STATES PATENT OFFICE 2,024,391

WHOLE GRAIN CORN CUTTER

John Schmidt, Buffalo, N. Y., assignor to Food Machinery Corporation, San Jose, Calif., a corporation of Delaware Application July 29, 1931, Serial No. 553,853

38 Claims. (Cl. 130—9)

This invention relates to a machine for cutting whole grain green corn for canning purposes and is particularly adapted to handle ears of corn of greatly varying sizes as to diameter and length.

In the cutting of whole grain corn the adjustment of the cutters relative to the kernel and cob structure and the manner of presenting the ears to the cutters and centering them thereto so the cut will be properly started and the cut made along the cob in the desired manner has been the subject of considerable experiment of machine manufacturers in general to devise a simple machine that would handle practically all lengths and diameters of ears as they come from the field and produce the maximum of properly cut kernels, and one of the difficult problems has been to so align the ears as they pass to the cutters that the commencement of the cut is properly started, after which the cut is continued without further trouble.

The manner in which the ears of corn are fed to the machine also has a material bearing on the subsequent operation of cutting the kernels from the cobs and in order to have the cut of each ear progress in the desired manner the ears are preferably fed in timed relation to the cutters and to each other. This gives the cutters the proper time to assume their normal positions after an ear has passed and be ready to receive the oncoming ear.

An automatic feed device for placing the ears into the feed devices is desirable because it always operates accurately in the proper timed relation with the other parts of the machine and insures that the ear is placed in exactly the right time and place for proper feeding to the cutters.

In presenting the ears to the cutters it is also desirable that each ear is centered by its axis instead of by one side resting on a feed device, whereby each ear will then enter the cutters exactly central irrespective of its diameter. It is also desirable that the centering devices and the cutters be positioned very close together axially so that the shortest ears will be properly guided and handled by the machine.

The machine disclosed by this application embodies all of the features just enumerated as well as other advantages and briefly includes the following mechanism.

A cutter head having expanding cutter elements and cob feed devices are positioned in fixed locations at one end of a machine frame. Aligned with the cutter elements and the cob feed devices are ear feeding, centering and aligning devices located on a reciprocating carriage whereby the ear of corn is received from an automatic feed device, centered by its axis and presented to the cutter elements in perfectly aligned position to have the kernels cut from the cob. The carriage has a reciprocating movement imparted thereto by properly timed mechanism and receives each ear as it is at the outer end of its reciprocation, the carriage then centers the ear axially and moves it point first to the cutter elements and starts the cut exactly central with each ear presented, the entire mechanism comprising the carriage moving forward with the ear guides and centering it to the cutter elements until the end of the cob projects beyond the cutter elements and is engaged by the cob feed elements which continue the axial movement of the ear through the machine. The reciprocation of the carriage is affected by means of a cam and it is so timed that it has a quick retreat after the ear is well placed in the cutter mechanism to remove the centering devices from contacting with the cutter housing. An automatic ear feed device is positioned at one side of the machine and comprises fixed and movable feed bars that engage the ears laid down promiscuously by an operator and moves them intermittently to the reciprocating feed devices in proper timed relation. While the reciprocating carriage is moving forward there is a feed chain mounted on the carriage that has continuous movement in the same direction which advances the ears faster than the forward movement of the carriage and thus brings them into perfect axial alignment before the point of the ear contacts with the cutter elements, all of which operations will be more fully explained when dealing with the details of construction and operation.

It is therefore an object of the invention to provide a machine for cutting whole grain kernels of corn wherein the ears are centered by their axes before being presented to the kernel cutting elements.

It is a further object of the invention to provide in a machine for cutting whole grain kernels of corn a reciprocating device for presenting the ears to the cutter elements.

It is a further object of the invention to provide a reciprocating device combined with a continuously moving device for presenting the ears to the cutting elements.

It is a further object of the invention to provide a plurality of axial feed elements for accelerating the movement of the ears to the cutter elements.

It is a further object of the invention to provide an auxiliary feed device to place the ears in timed relation into the machine.

It is a further object of the invention to provide a reciprocating feed device wherein the reciprocation is varied in its movement to facilitate removing certain of the feed elements rapidly away from their feeding positions.

It is a further object of the invention to provide a reciprocating feed device combining with a continuous feed device for presenting the ears to cutter elements and all driven from the same power source.

It is also an object to provide in the feeding of ears of green corn to cutter elements a reciprocating feed device combined with a continuous feed device wherein the reciprocating device moves the ear forward and the continuous device accelerates the movement to center and align the ear preparatory to presentation to cutter elements.

With such objects in view as well as other advantages inherent in the invention, the novel structural peculiarities, novel organization of elements, and the separate and collective operations involved in carrying out the recited objects of the invention, which will be made the subject matter of claims hereto appended, I wish it understood that the several necessary elements and combinations constituting the same may be varied in their proportions, placement, general arrangement and operative relation without departing from the scope and nature of the invention.

In carrying out the objects of the invention in a concrete form of machine, further objects, advantages and improvements have been evolved than have been recited, and in order to make the invention more clearly understood there are shown in the accompanying drawings means and mechanism embodying the preferred structural arrangement and disposition of the different parts and combinations of parts, in which there has been illustrated one way of embodying the creative part or concept of the invention. The described devices are simply embodiments of the invention which other structures might also employ and some of the parts and combinations of parts may be used without the others in different types of such machines without departure from the purview of the invention and I therefor regard myself as entitled to all such variations from the shown and described devices as fall within the scope and meaning of the claims.

It should be mentioned that the drawings accompanying these specifications are merely illustrative; they have not necessarily been drawn to scale and some of the parts may have been more or less exaggerated to more clearly illustrate the structure and operation, and they may not necessarily conform to the best engineering practices in constructing machines of this type.

Figure 1:
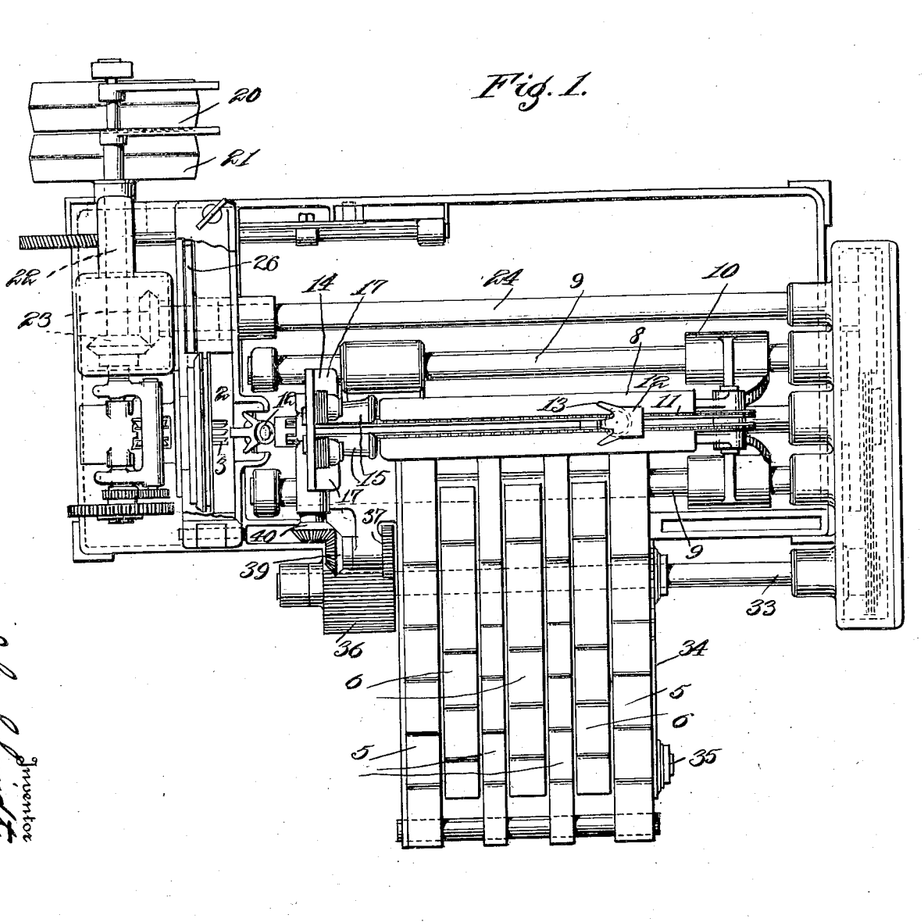
Figure 1 is a plan view of a machine embodying the invention.

The operative elements are mounted on a machine base or frame member 1. A cutter housing containing cutter elements is fixedly mounted on this base member at 2 the cutter elements not being shown in detail except in Figure 1 where their cutting points are just visible at 3, this cutter head is forming the subject matter of another application and need not be detailed here, except briefly although the inventive parts of the apparatus will operate perfectly with any well known cutter elements adapted to the cutting of whole kernels of green corn. The cutter head and elements shown with the machine are rotary in action and are driven by suitable gearing trained from the main drive shaft which will be referred to later on.

Just at the rear of the cutter housing 2 is fixedly mounted a set of feed devices for engaging the end of the cob as the ear advances through the cutter head as at 4, these devices constituting gear driven feed rolls having spurs for engaging the cobs and drawing them through the cutter elements after the feed device releases the ears.

At one side of the machine is positioned an auxiliary feed device comprising fixed notched bars 5 and movable bars 6.

Movement is imparted to the bars 6 through the combined rotary action of the cranks 7, which describe a rotary and circular path which gives to the attached bars an oscillatory movement carrying them below and above the fixed bars so that ears of corn laid on the fixed bars will be repeatedly engaged by the movable bars and lifted and advanced from notch to notch toward the main feed devices, a guard plate 8 acting to cause the ears to drop in operative relation with the main feed devices.

Positioned longitudinally of the base member are bars 9 forming a slide way for the reciprocating feed device.

The reciprocating feed device comprises a slide member 10, carrying a continuously moving feed chain 11 on which are mounted centering blocks 12 having centering prongs 13 which are adapted to engage the butt of the ear and center it axially.

At the front end of the slide member 10 is positioned a centering head 14 carrying centering shoes 15 which are geared to move in unison as the point of the ear is advanced therebetween, by the interlocking devices 16 and held in normal operative positions by the torsion springs 17.

A continuously moving cam member 18 connected to the slide member 10 through the medium of the cam roller 19 provides the means for imparting a variable speed reciprocating movement to the slide member 10.

Figure 2:
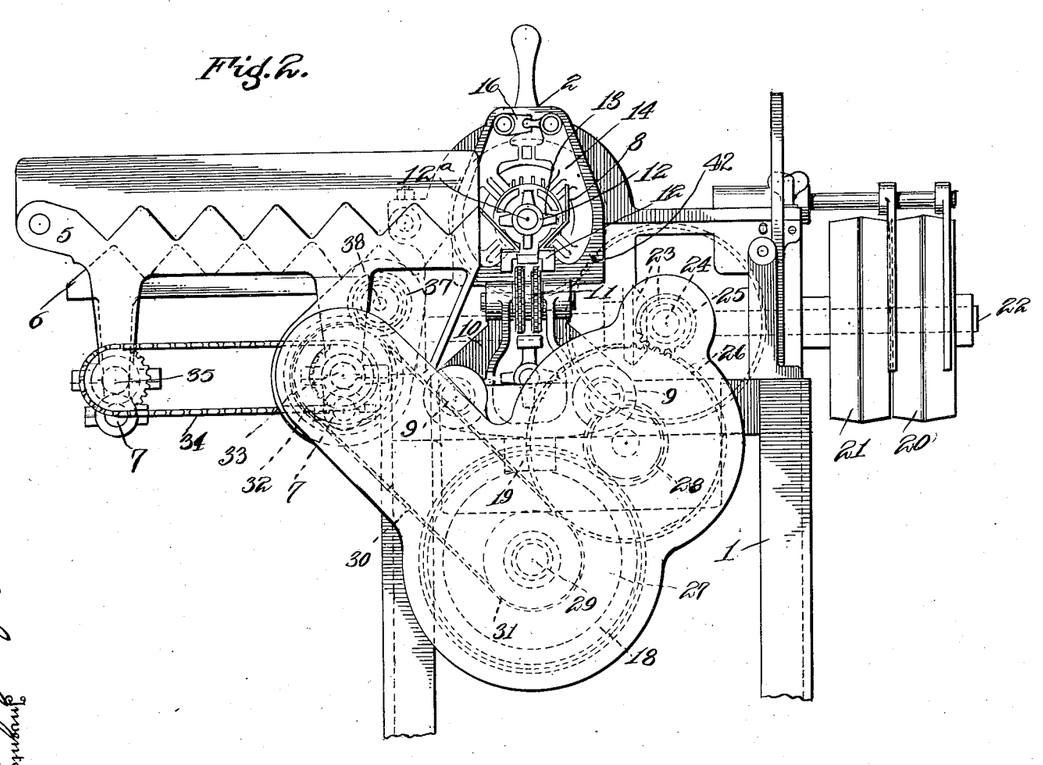
Figure 2 is an end view of Figure 1 looking from the right side.

Motion is imparted to the various devices through the following chain of gearing and other devices starting at the tight and loose pulleys 20 and 21, the shaft 22 receives continuous motion and through the gears 23 imparts motion to the shaft 24. The pinion 25 on shaft 24 meshing with the gear 26 drives the gear 27 through the pinion 28 which turns the shaft 29 carrying the cam member 18. A chain 30 sprockets 31 and 32 serve to transmit motion to the shaft 33, while the chain 34 and accompanying sprockets drives the shaft 35. The gear 26 also meshes with a gear 42 which is a part of the cutter head assembly and is shown in dotted lines in Fig. 2. This connection rotates the cutter head and knives for removing the whole grains from the cobs. This gear 42 is not shown on the plan view of Fig. 1 because the top of the cutter head housing has been broken away to better show the cutter elements. A part of gear 26 shows in Fig. 1.

Located on the forward end of the shaft 33 is an elongated gear 36 which imparts rotary movement to the pinion 37 secured to one end of the short shaft 38, the other end of 38 carrying the miter gear 39 meshing with the miter gear 40 secured to the shaft 41 which carries the sprocket for the chain 11 and through which the chain is given continuous movement, the pinion 37 maintaining sliding engagement with the gear 36 as the feed carriage 10 reciprocates in the operation of the machine.

The shaft 22 carries a pinion 42 meshing with a gear 43 which through the gear connections shown drive the spur feed wheels 44 which in turn engage the cob and draw it through the machine.

*Operation*

The operation of a machine embodying the structural features of that shown by the accompanying drawings will operate substantially as follows but may vary somewhat therefrom with a changed construction.

Motion being imparted to the machine through the belt 45 will cause the auxiliary feed bars 6 to move through an oscillatory path and gradually move ears of corn placed on the fixed bars, to the feed chain 11 where they will drop by gravity in front of one of the pronged centering heads 12 which has a hole 12a through its center to accommodate an unbutted ear of corn, meaning thereby one that has a piece of the stalk adhering, and as the pronged head 12 advances the butt end of the ear will be engaged and centered axially relative to the cutter elements.

The carriage 10 is moving forward at the same time but the chain 11 due to its mounting and geared connections moves faster than the carriage so that as the centering head 12 engages the butt of the ear the ear is pushed forward faster than the forward movement of the carriage 10 so that the point of the ear will enter into the shoes 15 and be centered axially thereby so that by the time the ear has reached the point of entering the cutters it will have passed through the centering shoes and the combined forward movement of the carriage 10 and the chain 11 will give it quick passage therethrough so that the forward end of the cob will be engaged by the spur feed rollers 44 before the butt of the ear is released by the centering head 12. Just as soon as the cob is engaged by the rollers 44 the carriage 10 can be reversed in its movement and given a quick reverse to permit the centering heads 12 an opportunity of passing around the sprockets and clear the cutter housing, this operation being clearly shown in Figure 3 where one of the heads is just passing around the sprockets.

There are three of the centering heads 12 on the chain 11 so that a space for an advancing ear is always presented as the auxiliary feed moves the ears to feeding position.

Figure 3:
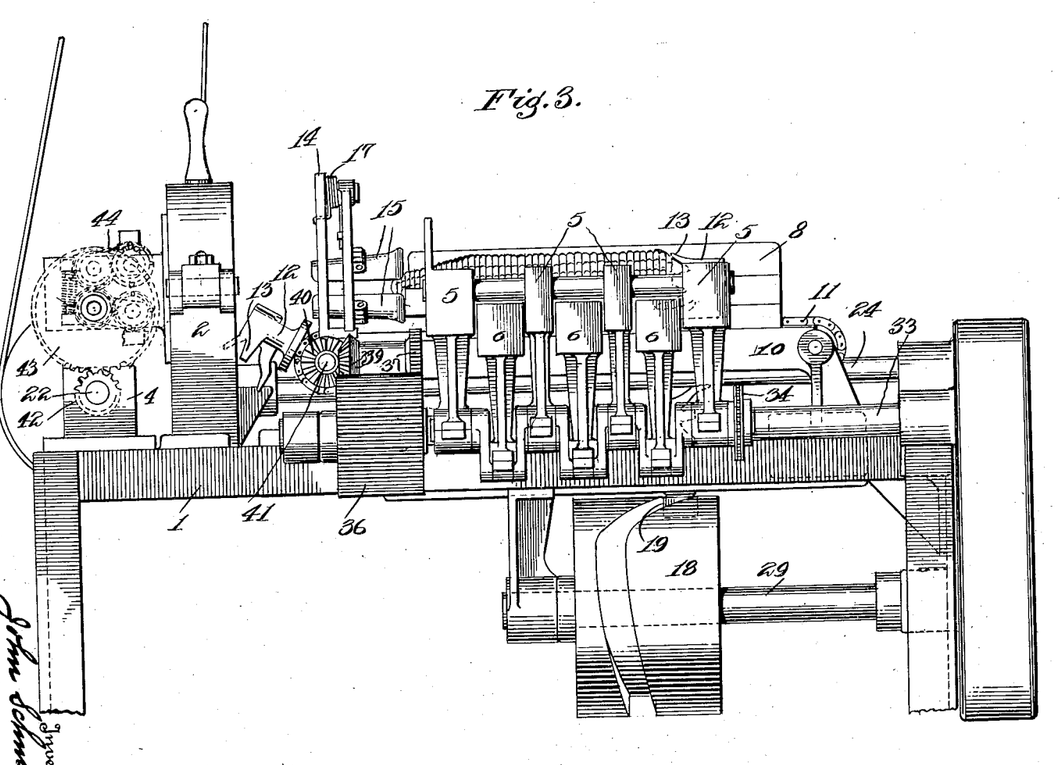
Figure 3 is a side elevation showing an ear of corn just placed and ready to be axially aligned.
Figure 4:
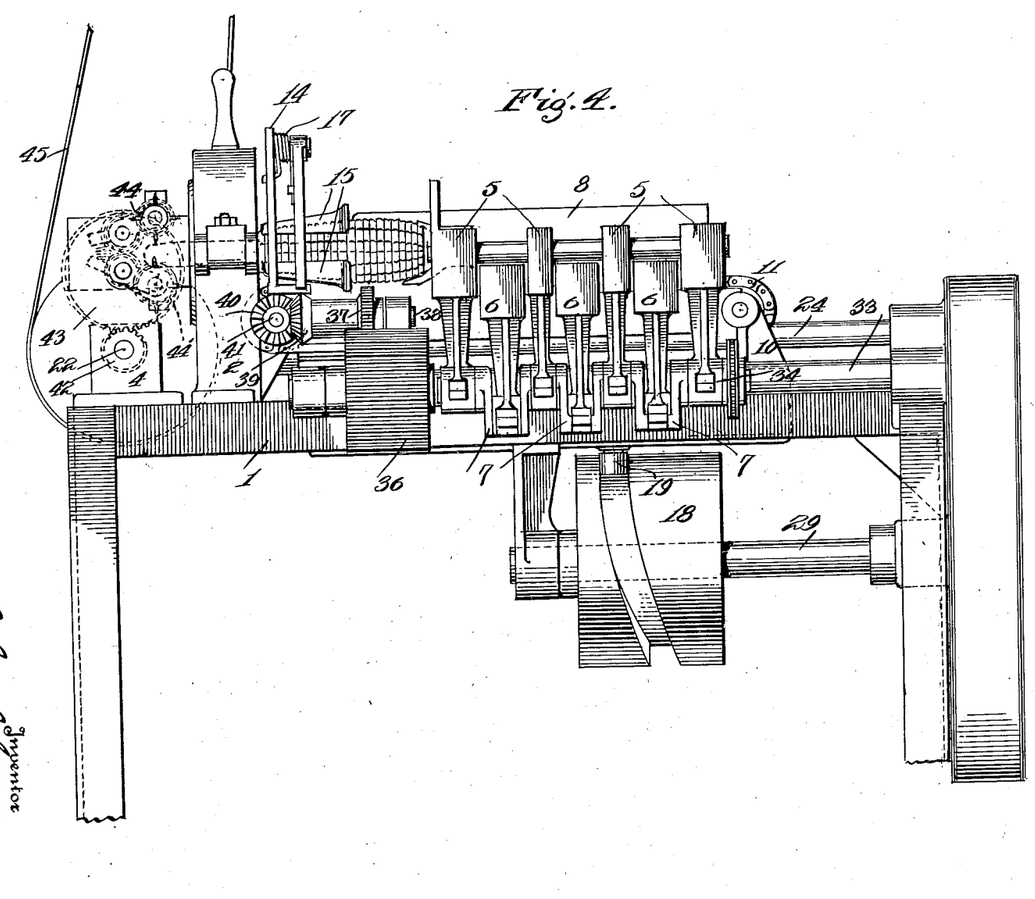
Figure 4 is a view similar to Figure 3 but with the ear partially advanced through the cutter elements.

In the position of the mechanism of Figure 3 the ear has just been engaged by a centering head 12 and started its advance into the centering shoes 15; the carriage 10 is just starting its advance, or will just as soon as the head 12 gets around the sprocket far enough so the advance will not contact with the cutter housing, while Figure 4 shows the ear partly through the cutter head and the point of the cob engaged by the feed rollers 44. The carriage 10 will now start to recede with rather a quick reverse so that the centering head 12 here in engagement with the butt of the ear will have space to pass around the sprocket and clear the housing carrying the cutter elements, as is shown in Figure 3.

On account of centering each ear axially to the cutter elements every ear of whatever diameter is properly centered to have the kernels removed in the most perfect and accurate manner, and as the butt of the ear is engaged by the prongs 13 on the heads 12 and the point of the ear by the shoes 15 the ear is raised slightly away from its contact with the chain 11 so that the ear is wholly supported by the heads 11 and the centering shoes 15 as it is passed into the operative zone of the cutter elements.

It should be mentioned that applicant has produced an apparatus for cutting whole kernels of green corn from the cobs wherein the initial feed devices do not in any manner rupture or mutilate the delicate kernels in feeding the ears to the cutting devices. This most desirable result is accomplished through utilizing the ear aligning devices that align each ear axially with the cutting devices as the feed devices also, for presenting the ears to the cutting devices. The aligning devices engage the ears only by the outer surfaces of the kernels for aligning and one aligning device engages the butt end of the ear to supply the force necessary to push the ear into the cutting devices. By engaging only the surfaces of the uncut kernels on the cob none of the kernel skins are ruptured and there is no loss of milk or kernel contents so that the product of whole kernels are whole in every sense and not composed of partly mutilated kernels.

What I claim as new and desire to secure by Letters Patent is:

1. An apparatus for cutting whole grain corn from the cob comprising a cutting device and feed rollers for engaging a cut cob and drawing it through said cutting device, a reciprocating member for advancing ears of corn to said cutting device and an auxiliary movable device carried by said reciprocating member and moving thereon for advancing the ears along said reciprocating device into said cutting device and pushing them thereinto until the cut cobs are engaged by said feed rollers.

2. An apparatus for cutting whole grain corn from the cob comprising a continuous rotary cutting device, feed devices for engaging a cut cob and drawing it through said cutting devices, a plurality of ear feed members each moving in the same direction and simultaneously advancing ears of corn to said cutting device and through the same until the cut cob is engaged by said feed rolls, one of said feed members being endless and flexible and the other reciprocatory, the reciprocatory member wholly supporting the endless flexible member.

3. An apparatus for cutting whole grain corn from the cob comprising a rotary cutting device and feed devices for engaging a cob and pulling it through said cutting devices, an ear feed device comprising a reciprocating member and an endless moving member each acting simultaneously to feed ears of corn to said cutting device, said endless moving member being carried by said reciprocating member.

4. An apparatus for cutting whole grain kernels from the cob comprising a rotary cutting device and a cob feed device, an ear feed device comprising a reciprocating member, a continuously moving member carried by said reciprocating member and movable back and forth therewith and drive means for imparting continuous movement thereto, means for placing ears of corn on said members whereby they are advanced to said cutting device at a speed greater than said reciprocating member for removing the kernels therefrom.

5. An apparatus for cutting whole grain corn from the cob comprising a rotary cutting device and a feed device, an ear feed device comprising a reciprocating member with a continuously moving member carried thereby with continuous drive means for imparting motion to said continuously moving member, means for placing ears of corn on said reciprocating member timed and in operative relation with said continuously moving member whereby said member engages each ear in spaced relation and advances the ears to said cutting device at an accelerated speed relative to said reciprocating member, means for reciprocating said member at varying speeds during each cycle of movement.

6. An apparatus for cutting whole grain corn from the cob comprising a rotary cutting device and a feed device, an ear feed device comprising a reciprocating member having accelerated movement at one end of its stroke and a continuously moving member carried thereby, means for placing ears of corn on said reciprocating member timed and in operative relation with said continuously moving member whereby the combined movements advances the ears of corn into said cutting device, with rotary means for giving a quick return to said ear feed assembly as the ear is delivered to the cutting devices.

7. An apparatus for operating on elongated articles comprising an operating element, means for advancing articles through said element comprising a plurality of continuously moving feed devices, one of said devices consisting of a reciprocating member and a continuously moving accelerating member carried thereby, means for placing articles on said members and means for actuating said members to move in differential relation to advance articles into said operating element and into the control of said other feed devices, with means for accelerating the speed of said reciprocating member at one end of the stroke.

8. An apparatus for operating on elongated articles comprising an operating element, means for advancing articles through said operating element comprising a plurality of feed devices, one of said devices consisting of a reciprocating member and a continuously moving accelerating member carried thereby, means partly on said accelerating member for aligning said articles axially and means for moving the said members in differential relation to advance articles into and partially through said operating element and into the control of another of said feed devices with means for accelerating the speed of said reciprocating member at one end of its stroke.

9. An apparatus for treating elongated articles comprising an operating element, means for advancing articles into and through said operating element, said means comprising a plurality of continuously moving means and a reciprocating means for supporting and imparting reciprocating movement to said several continuously moving means, means for placing articles on said reciprocating means and in operative relation with one of said continuously moving means the combined movement of said means acting to advance said articles into said operating means at an accelerated speed relative to said reciprocating means.

10. An apparatus for cutting corn from the cob comprising a rotary cutter head and feed devices associated therewith, one of said feed devices comprising a reciprocating member, means for moving said member at varying speeds, a continuously moving accelerating member carried by said reciprocating member for advancing the ears ahead of said reciprocating member into and through said cutter head and into the control of other of said feed devices, with drive means for imparting continuous movement to said accelerating members.

11. An apparatus for cutting green corn from the cob comprising a rotary cutting element with cutting knives, an element for feeding ears of corn to said cutting element comprising a slide member, means for imparting reciprocating movement to said member, an endless continuously moving feed member wholly supported by said slide member, means carried by said slide member for imparting continous movement to said feed member, said means having sliding engagement with a drive member located adjacent said slide member, and means for feeding ears of corn to said feed member.

12. An apparatus for cutting green corn from the cob comprising a rotary cutting member having cutting knives, means for feeding ears of corn to said cutting member comprising a slide member, a continuously moving means for imparting movement to said slide member and for accelerating said member during a part of its stroke, an endless continuously moving auxiliary feed member wholly supported by said slide member, means carried by said slide member for imparting continuous movement to said auxiliary feed member, a drive means located adjacent the path of movement of said feed device and having sliding engagement with the means for imparting movement to the auxiliary feed member and means for feeding ears of corn in succession to said feed member.

13. An apparatus for cutting green corn from the cob comprising cutting means, a combined reciprocating and continuously moving means for feeding corn to said cutting means, said continuously moving means being carried by and wholly supported by said reciprocating means and consisting of an endless chain, sprockets over which said chain is trained, a spur gear and bevel gears to impart movement to said chain and a continuously moving element connecting with said spur gear to impart movement thereto, with means for feeding ears of corn in spaced succession to said feed chain.

14. An apparatus for cutting green corn from the cob comprising cutting means, a combined reciprocatory and continuously moving means for feeding corn in timed and spaced relation to said cutting means, said continuously moving means being carried by and wholly supported by said reciprocating means, a gear train carried by said reciprocating means and connected to said continuously moving means and a drive gear adjacent said gear train and having sliding engagement therewith to impart continuous movement thereto, with means for feeding ears of corn to said reciprocating device.

15. An apparatus for cutting green corn from the cob comprising cutting elements, a reciprocatory feed device for feeding ears in spaced relation to said cutting elements, a continuously moving accelerating feed device supported by and wholly carried by said reciprocating device, means for imparting movement to said accelerating device to cause it to move the ears at a speed greater than that imparted by the reciprocating device, ear centering means on said accelerating device and means for imparting a quick return to said reciprocating and accelerating device, with means for engaging the cobs and drawing the ears through the cutting elements.

16. An apparatus for cutting green corn from the cob comprising cutting elements, a reciprocatory feed device for moving ears in spaced relation to said cutting elements, an accelerating device supported and carried by said reciprocating device and having a plurality of ear feeding and aligning members, cam means for imparting reciprocation to said device and gear means for imparting accelerating movement to the accelerating device, with means for feeding ears of corn in timed relation with the movement of said aligning members, with means for engaging the cobs and moving the ears through the cutting elements.

17. An apparatus for cutting green corn from the cob comprising cutting elements, an accelerating feed device for presenting ears in spaced succession to said cutting elements, said accelerating feed device moving continuously in the same direction, with means for imparting reciprocation to said accelerating device and other means for imparting continuous movement thereto, said accelerating device being provided with a plurality of ear aligning devices, and means for feeding ears of corn in timed relation with the movement of said aligning devices, with means for engaging the cobs and moving the ears through said cutting means.

18. An apparatus for cutting green corn from the cob comprising a reciprocating feed device and an accelerating device mounted thereon, means for imparting reciprocation to said feed device and for giving a quick return thereto, means for imparting continuous forward movement to said accelerating device to move the ears forward faster than the reciprocating device moves, a plurality of ear engaging and aligning devices on said accelerating device, an ear feed means for placing ears in timed relation with said aligning devices, the movement of said reciprocating device carrying the ears into the operative zone of cutting devices, other means for engaging the forward ends of the cobs and drawing the ears through the cutting devices, with means for placing the ears in timed relation with said aligning devices.

19. An apparatus for cutting green corn from the cob comprising rotary cutting means, means for imparting rotation to said cutting means, a reciprocatory feed means for placing ears into the control of said cutting means, accelerating means for moving the ears ahead of the said reciprocating means, means back of said cutting means for engaging the cobs and drawing the ears through the cutting means, means for reciprocating the feed means and for imparting a quick return thereto, separate means for imparting movement to said accelerating means, a plurality of ear aligning means carried by said accelerating means, feed means consisting of a series of movable and fixed bars for intermittently moving ears and placing them in timed relation with said aligning means.

20. An apparatus for cutting green corn from the cob comprising rotary cutting elements, ear feed means in the front and back of said cutting elements one or the other of said feed means always having engagement with an ear while passing through said cutting elements, the feed means for feeding ears into said cutting elements consisting of a reciprocating slide member, means for imparting reciprocation thereto and to accelerate the return of said slide member, an ear accelerating device carried by said slide member and always moving in the same direction relative thereto, ear feed means for placing ears into feeding relation with said slide member and said ear accelerating device, with a single power source for driving all of said elements in timed relation.

21. An apparatus for cutting whole grain corn from the cob comprising a rotary cutting device, feed rollers back of said cutting device for engaging a cob after the kernels have been removed therefrom and drawing it through said rotary cutting device, a reciprocating member carrying an endless feed member movable relative thereto for initially advancing ears of corn to said cutting device by end engagement and pushing them through said cutting device until the cut cob is engaged by said feed rollers, with means for rotating said cutting device and said feed rollers, and means for simultaneously actuating the reciprocating and endless member.

22. An apparatus for cutting whole kernels from green cobs comprising a rotary cutting device, a reciprocating ear feed device for receiving and moving ears toward said rotary cutting device, continuously moving means carried by said reciprocating means for moving the ears relative to said reciprocating means to thereby advance them at an accelerated speed, the said combined means acting to initially feed the ears into and partly through said rotary cutting device whereby the kernels are partially removed from the cobs, rotary feed means for engaging the cut cobs and completing the movement of the ears through the said rotary cutting device to complete the cutting of the kernels from the cob.

23. An apparatus for cutting whole kernels from green cobs comprising a rotary cutting device, a reciprocating ear feed device for receiving and moving ears toward said rotary cutting device, continuously moving means carried by said reciprocating device and wholly supported thereon for engaging the ends of the ears and positioning them relative to said rotary cutting device and moving them relative to said reciprocating device to accelerate their speed, a sliding engagement carried by said reciprocating device for imparting continuous motion to said continuously moving means, the combined movement of said reciprocating device and the continuously moving device carried thereby acting to initially move the ears into and partly through said rotary cutting device for a partial removal of the kernels therefrom, rotary feed means for engaging the cut cobs and completing the movement of the ears through the said rotary cutting device and completing the removal of the kernels from the cob, with means for moving the aforesaid elements in timed relation.

24. An apparatus for cutting whole kernels of corn from green cobs comprising a rotary cutting device, a combined reciprocating and continuously moving feed device the continuously moving device being carried by said reciprocating device and movable relative thereto for imparting an accelerated forward movement to positioned ears of green corn, the said combined device being the sole means for advancing ears into and partly through said rotary cutting devices, rotary feed means for engaging the cobs as they pass through said cutting device and continuing the movement of the ears through said cutting device with power means for said devices.

25. An apparatus for cutting whole kernels of green corn from the cobs comprising kernel cutting devices, a reciprocating device and a continuously moving feed device mounded on and reciprocating device and differentially movable therewith for initially presenting positioned ears to said kernel cutting devices, means associated with said combined feed devices to center each ear relative to said cutting devices by its axis regardless of its diameter, the said reciprocating and continuously moving feed device imparting a differential movement to the ears so they move faster than the reciprocating device, means for engaging the ends of the cut cobs and drawing the ears away from said initial feeding devices and thereby completing the movement of the ears through the cutting devices with power means for operating said devices in timed relation.

26. An apparatus for cutting whole kernels of green corn from the cob comprising kernel cutting means, a feed device comprising reciprocating and continuously moving members one carried by the other and means for imparting differential lineal movement relative thereto to move the ear faster than the movement of the reciprocating member for initially presenting ears of green corn to said cutting devices, means associated with said combined feed devices to center one end of each ear relative to said cutting devices and other means associated with said feed devices for centering the forward end of each ear relative to said cutting devices, with means for engaging the cobs after passing the said cutting devices to complete their passage therethrough with power means for actuating said devices.

27. An apparatus for cutting whole kernels of green corn from cobs comprising kernel cutting devices, a combined reciprocating and a continuously moving ear feed device, the reciprocating device wholly supporting the said continuously moving device and separate means for imparting reciprocating movement and continuous movement to said devices for presenting ears to said cutting devices, means associated with said feed device for axially centering one end of each ear as it is advanced, other means along the path of movement of said ears for engaging the forward end of each ear and axially aligning it with said cutting devices, the said feed devices passing through said fixed aligning device as the ear is presented to said cutting devices so that the alignment position cannot change while the ear enters the cutting devices.

28. An apparatus for cutting whole kernels of green corn from cobs comprising rotary kernel cutting devices, a combined reciprocating and continuously moving ear feeding device for presenting ears to said cutting devices, said reciprocating device wholly supporting said continuously moving device and separate means for imparting reciprocating movement and continuous movement to said devices, means associated with said feed device for encircling the rear end of an ear and axially centering it relative to said cutting devices, fixed means supporting aligning devices that engage the forward end of the ear and axially align it relative to said cutting devices, a mounting for said aligning devices so the entering ear may expand them and be thereby held in the desired axial alignment as it enters the said cutting devices.

29. An apparatus for cutting whole kernels of green corn from cobs comprising rotary kernel cutting devices, a reciprocating member carrying a continuously moving feeding device for moving ears of green corn to said kernel cutting devices at an accelerated speed, guide and centering means associated with said continuously moving feeding device for engaging the rear end of an ear of corn and axially aligning it relative to said cutting devices and for maintaining engagement with said ear until it has entered the said cutting devices, a fixed standard along the path of travel of said ear, yieldable guide means located on said fixed standard and adapted to engage the front end of the advancing ear of corn and centering it axially relative to said cutting means and to maintain engagement therewith until the ear has entered the said cutting means, the said guide and centering means maintaining engagement with the rear end of the ear while passing through and beyond said yieldable guide means, with other feed means back of said cutting means for engaging the end of the cut cob and drawing it through the cutting means after the first said feed means releases the ear.

30. An apparatus for cutting whole kernels from cobs comprising kernel cutting devices, a feeding means consisting of a reciprocating element and an endless feed element wholly carried thereby, means for imparting movement to the reciprocating element and means associated therewith for imparting feeding movement to said endless feed element aside from its reciprocation with said reciprocating element, the reciprocating movement of said element combined with its continuous movement resulting in advancing ears of corn faster than the speed of either of said elements alone.

31. An apparatus for cutting whole kernels of green corn from cobs comprising rotary kernel cutting means, and means for imparting rotation to said cutting means, a feeding means for moving ears to said cutting means comprising a reciprocating element and a continuously moving rotary element mounted on and carried by said reciprocating element, continuous rotary means for imparting continuous rotary movement to said feeding element, an ear centering device carried by said continuous feed element and engaging the rear end of each ear as fed, another ear centering device carried by said reciprocating element and engaging the forward end of each ear as fed, the said centering devices aligning said ear axially with said cutting means and both acting in unison to present the aligned ear to said cutting means, with other feed means for engaging the cut cob after the ear has passed partly through said cutting device and continuing the movement of said ear through the cutting device.

32. An apparatus for cutting whole kernels of green corn from cobs comprising kernel cutting means, a reciprocating feeding element and means for imparting a variable reciprocation to said element, an auxiliary feeding element carried wholly by said reciprocating element with means for imparting continuous feeding movement to said auxiliary feeding element, the combined movement of said reciprocating element and the auxiliary feed element carried thereby acting to move said ear faster than the feed movement of either of said elements alone, the feeding movement of said elements acting to force a positioned ear into said kernel cutting elements, aligning means carried by said auxiliary feeding means to axially align the butt end of each ear with said cutting means, centering and guide means adapted to engage the forward end of each ear and align it axially with said cutting means, said aligning means carried by said auxiliary feeding means passing through said centering and guide means to force the ear into the said cutting means, the variable power element acting to impart a quick return movement to the feed elements just as they release the ear to the cutting means and other feed means for engaging the cut cob just before the ear is released by the main feed means and continuing the movement of the ear through the cutting means.

33. An apparatus for cutting whole kernels of green corn from cobs comprising a kernel cutting means, an ear feed means for presenting ear to said cutting means comprising a reciprocating element and a continuous rotary element carried thereby, means for imparting variable reciprocation to said feed element and means for imparting continuous rotary movement to said feed element carried by the reciprocating element, aligning devices associated with said feed elements one of which is carried by the rotary element and the other carried by the reciprocating element for axially aligning each ear with the cutting means, the variable power means acting to give a quick return movement to the said reciprocating feed element just as the aligning devices release the ear to the cutting means with other feed means for engaging the cut cob and completing the movement of the ear through the cutting means.

34. An apparatus for cutting whole kernels of green corn from the cobs comprising kernel cutting means, variable speed reciprocating means and continuously moving endless feeding means wholly supported thereby for feeding ears of green corn to said cutting means, ear centering means carried by said reciprocating and endless feeding means for axially aligning the butt end of each ear to the said cutting means, other centering means for aligning the tip end of each ear, the centering means acting as the sole support for the ears after alignment and until they are forced into the said cutting means with other feed means for engaging the cut cobs and removing them from the machine.

35. An apparatus for cutting whole grain corn from the cob comprising a kernel cutting device, a reciprocating member, continuously moving feed and ear centering devices wholly supported and carried by said reciprocating member, means for imparting a variable reciprocating movement to said reciprocating member and other means for imparting a continuous movement always in the same direction to the feed device carried by said reciprocating member, the combined means acting to impart differential movement between said reciprocating member and said feed device carried thereby which acts to accelerate the feeding of the ears to said kernel cutting device, the means for imparting variable reciprocating movement to said reciprocating member imparting a quick reverse movement to said member near the forward end of its movement.

36. An apparatus for cutting whole grain corn from the cob comprising a kernel cutting device, a reciprocating member, continuously moving feed and ear centering devices wholly supported and carried by said reciprocating member, rotary means for imparting a variable movement to said reciprocating member, and other rotary means for imparting a continuous movement always in the same direction to the feed devices carried by said reciprocating member, the combined movement imparting means acting to move the feed devices faster than the forward movement of the reciprocating member which moves the ears of corn at an accelerated speed enabling the passing of the ears entirely through the ear centering device carried by the reciprocating member before they are released from the feed devices.

37. An apparatus for cutting whole grain corn from the cob comprising a kernel cutting device, a reciprocating member, an ear centering device wholly supported and carried by said reciprocating member, an ear feeding device comprising an endless flexible member having ear engaging means thereon and wholly supported and carried by said reciprocating member, a continuous rotary means for imparting variable reciprocation to said reciprocating member, a continuous rotary means for imparting continuous feed movement to said ear feeding device carried by said reciprocating member, the separate drive means for the ear feeding member giving an accelerated movement thereto so that each ear is advanced faster than the forward movement of the reciprocating member which accelerated movement causes each ear to pass entirely through the centering device carried by the reciprocating member before it is released by the feed device, the variable moving device giving a quick reverse movement to the reciprocating member near the end of its forward stroke to permit the feed devices to clear the kernel cutting devices as the ear is released thereto.

38. An apparatus for cutting whole grain corn from the cob comprising a kernel cutting device, a reciprocating member, an ear centering device wholly supported and carried by said reciprocating member, and a continuously moving ear feeding device wholly supported and carried by said reciprocating member, means for imparting a variable reciprocating movement to said reciprocating member to impart forward feed movement to the ear feeding devices carried thereby, separate movement imparting means for giving feeding movement always in the same direction to said ear feeding devices at an accelerated speed relative to the speed of the reciprocating member, the said accelerated speed given to the ears serving to pass them entirely through the said centering device as they are fed to the kernel cutting device, with means for engaging the cut cob and drawing the entire ear through the kernel cutting device.

JOHN SCHMIDT.

CERTIFICATE OF CORRECTION.

Patent No. 2,024,391. December 17, 1935.

JOHN SCHMIDT.

It is hereby certified that error appears in the printed specification of the above numbered patent requiring correction as follows: Page 6, first column, line 16, claim 25, for the words "mounded on and" read mounted on said; and that the said Letters Patent should be read with this correction therein that the same may conform to the record of the case in the Patent Office.

Signed and sealed this 25th day of February, A. D. 1936.

Leslie Frazer (Seal) Acting Commissioner of Patents.